(12) United States Patent
Benco et al.

(10) Patent No.: US 7,254,395 B2
(45) Date of Patent: Aug. 7, 2007

(54) REQUEST TO MOBILE STATION TO CHANGE TO COMMON MODE OF COMMUNICATION UPON ENTRY INTO ZONE

(75) Inventors: David S. Benco, Winfield, IL (US); Kevin J. Overend, Elmhurst, IL (US); Baoling S. Sheen, Naperville, IL (US); Sandra L. True, St. Charles, IL (US); Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 338 days.

(21) Appl. No.: 10/859,490

(22) Filed: Jun. 2, 2004

(65) Prior Publication Data

US 2005/0272427 A1  Dec. 8, 2005

(51) Int. Cl.
*H04Q 7/20* (2006.01)

(52) U.S. Cl. .................. 455/438; 455/438; 455/436; 455/440; 370/331

(58) Field of Classification Search ............... 455/438, 455/436, 440, 444, 456.1, 435.1; 370/331
See application file for complete search history.

(56) References Cited

U.S. PATENT DOCUMENTS

| 6,353,621 | B1* | 3/2002 | Boland et al. | 370/467 |
| 6,965,868 | B1* | 11/2005 | Bednarek | 705/9 |
| 2002/0090953 | A1* | 7/2002 | Aburai et al. | 455/456 |
| 2003/0119445 | A1* | 6/2003 | Bromham et al. | 455/39 |
| 2003/0203731 | A1* | 10/2003 | King et al. | 455/407 |
| 2004/0157600 | A1* | 8/2004 | Stumpert et al. | 455/432.1 |
| 2004/0176111 | A1* | 9/2004 | Wilhelm | 455/456.6 |
| 2005/0245236 | A1* | 11/2005 | Servi et al. | 455/411 |

* cited by examiner

*Primary Examiner*—Joseph Feild
*Assistant Examiner*—Huy D Nguyen

(57) ABSTRACT

A mobile switching component of an apparatus in one example requests a mobile station to change to a common mode of communication upon entry of the mobile station into a zone, wherein every mobile station supported by the mobile switching component in the zone employs the common mode of communication.

20 Claims, 6 Drawing Sheets

REQUEST TO MOBILE STATION TO CHANGE TO COMMON MODE OF COMMUNICATION UPON ENTRY INTO ZONE

TECHNICAL FIELD

The invention relates generally to telecommunications and more particularly to mobile station communications.

BACKGROUND

Mobile stations receive wireless service from one or more wireless networks. The wireless networks in one example comprise a plurality of base stations. The base stations communicate with the mobile stations to provide the wireless service. To provide wireless service to a mobile station, a base station sends and/or receives signals to and/or from the mobile station. Where the mobile station travels to an area of weak wireless coverage, for example, a location in which the base station is unable to send/receive signals to/from the mobile station, the mobile station fails to receive wireless service from the base station. For example, where a user of a mobile station enters a building, the mobile station fails to receive wireless service within the building.

In known wireless service solutions, a microcell is employed within the area of weak wireless coverage to provide wireless service to mobile stations within the area. A microcell employs a mode of communication to provide wireless service to mobile stations within the area. The mode of communication in one example comprises a wireless protocol (e.g., Code Division Multiple Access ("CDMA"), Time Division Multiple Access ("TDMA"), Global System for Mobile Communications ("GSM"), analog, and Universal Mobile Telecommunications System ("UMTS")) and a radio frequency ("RF") (e.g., 850 MHz, 1.8 GHz, 1.9 GHZ, and 2 GHz). A microcell provides wireless service only to mobile stations that employ the mode of communication of the microcell, for example a wireless protocol and a radio frequency. As one shortcoming, to increase the likelihood that a mobile station will receive wireless service within an area, multiple microcells need to be installed within the area to support the multiple wireless protocols and the multiple radio frequencies employed by the mobile stations. Significant cost is associated with each installation of a microcell within an area. It is desirable to provide wireless service to a maximum number of mobile stations within an area through employment of a minimum number of microcells.

Thus, a need exists for reducing a cost for providing wireless service to mobile stations within an area.

SUMMARY

A zone of a mobile network, for example, a microcell within a building, provides wireless service to mobile stations within the zone through employment of a single mode of communication. Upon entry of a mobile station into the zone, a mobile switching component requests the mobile station to change to the single mode of communication. Where the mobile station changes to the single mode of communication, the mobile station receives the wireless service within the zone.

In one embodiment, there is provided an apparatus comprising a mobile switching component that requests a mobile station to change to a common mode of communication upon entry of the mobile station into a zone, wherein every mobile station supported by the mobile switching component in the zone employs the common mode of communication.

In another embodiment, there is provided a method for: determining an entry of a mobile station into a zone; initiating a request to the mobile station to change to a common mode of communication; and supporting wireless service for every mobile station in the zone that employs the common mode of communication.

DESCRIPTION OF THE DRAWINGS

Features of exemplary implementations of the invention will become apparent from the description, the claims, and the accompanying drawings in which:

DETAILED DESCRIPTION

Figure 1:
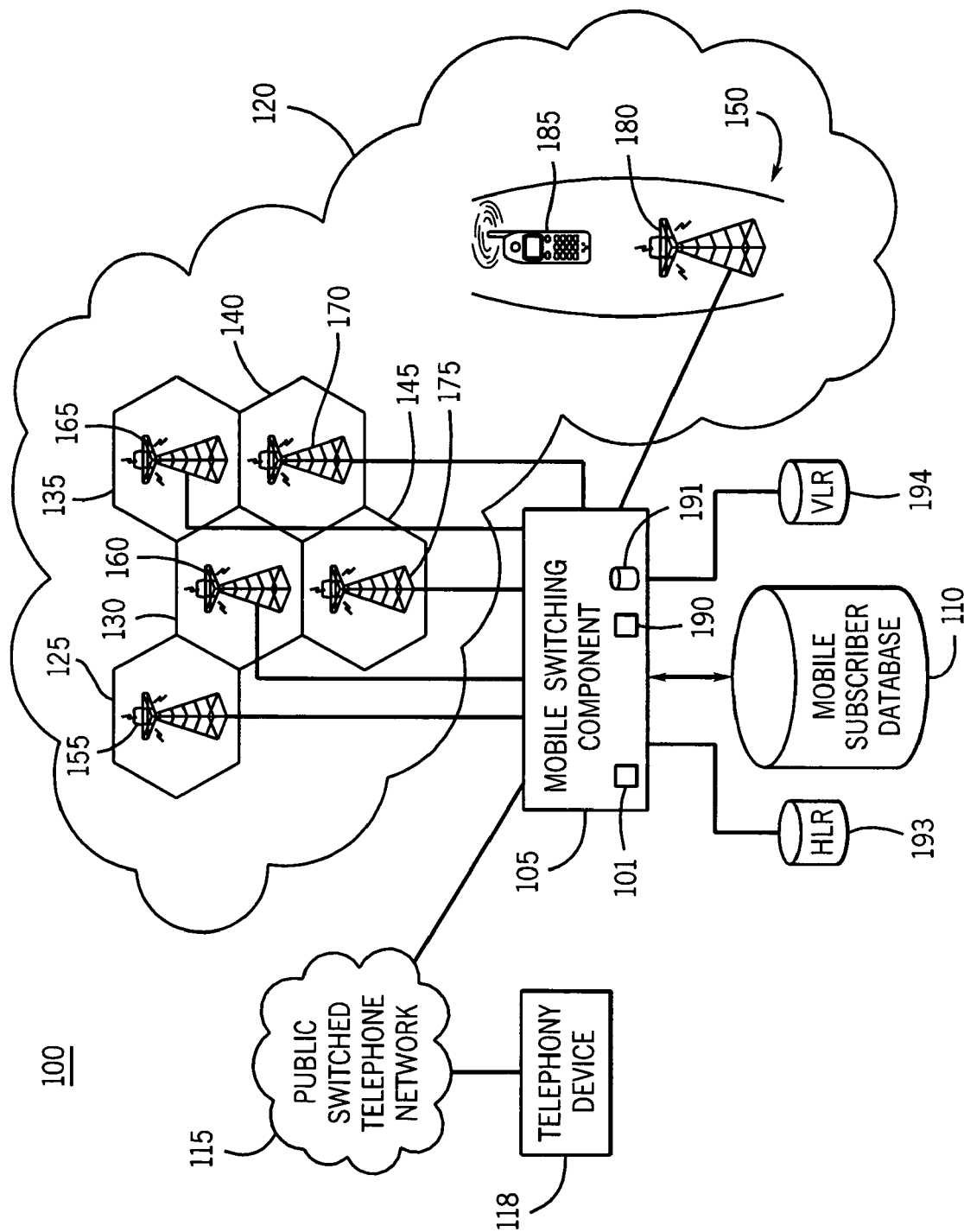
FIG. 1 is a representation of one implementation of an apparatus that comprises one or more mobile switching components, one or more mobile subscriber databases, and one or more networks.

Turning to FIG. 1, an apparatus 100 in one example comprises one or more mobile switching components 105, one or more mobile subscriber databases 110, and one or more networks 115 and 120. The mobile switching component 105 in one example comprises a switch. The mobile switching component 105 in one example connects the networks 115 and 120. The mobile switching component 105 comprises an instance of a recordable data storage medium 101, as described herein. The mobile subscriber database 110 in one example comprises one or more mobile subscriber records for one or more users of one or more mobile stations 185. A mobile subscriber record in one example comprises one or more modes of communication supported by a mobile station, for example, the mobile station 185. The mobile station 185 comprises one or more dual band, dual mode, or dual band/dual mode phones. The modes of communication in one example comprises one or more wireless protocols and one or more radio frequencies ("RF"). The wireless protocols in one example comprise one or more of: Code Division Multiple Access ("CDMA"), Time Division Multiple Access ("TDMA"), Global System for Mobile Communications ("GSM"), analog, and Universal Mobile Telecommunications System ("UMTS"). The radio frequencies in one example comprise one or more of: 850 MHz, 1.8 GHz, 1.9 GHZ, and 2 GHz. The mobile station 185 in one example employs a default mode of communication, for example, a 2 GHz TDMA mode of communication.

The network 115 comprises a public switched telephone network ("PSTN"). The network 120 comprises a mobile network. The network 120 in one example comprises one or more zones 125, 130, 135, 140, 145, and 150. The zones 125, 130, 135, 140, 145, and 150 in one example comprise one or more cells, as will be understood by those skilled in the art. The zones 125, 130, 135, 140, 145, and 150, in one example comprise one or more base stations 155, 160, 165, 170, 175, and 180 and network equipment, for example, switches and routers, that support one or more modes of communication within the zones 125, 130, 135, 140, 145, and 150, as will be described herein. The mobile switching component 105 connects one or more calls between a telephony device 118 of the network 115 and one or more mobile stations 185 of the network 120. The telephony device 118 in one example comprises a landline. The base stations 155, 160, 165, 170, 175, and 180 provide wireless service to one or more mobile stations, for example, a mobile station 185 within the zones 125, 130, 135, 140, 145, and 150, as will be understood by those skilled in the art. The mobile switching component 105 cooperates with the base stations 155, 160, 165, 170, 175, and 180 to support wireless services for the mobile station 185 within the zones 125, 130, 135, 140, 145, and 150. The zone 150 in one example comprises a microcell. Zone 150 in one example comprises a limited area, for example, a parking garage, a building, and a floor of a building.

The mobile switching component 105 maintains a location of a mobile station within the network 120. For example, the mobile switching component 105 determines that the mobile station 185 is within the zone 125 at a first time, and within the zone 150 at a second time. The mobile switching component 105 maintains the location of the mobile station 185 within the network 120 through receipt of one or more notifications from the base stations 155, 160, 165, 170, 175, and/or 180, as the mobile station 185 travels between the zones 125, 130, 135, 140, 145, or 150. The mobile switching component 105 determines entry of the mobile station 185 into and/or out of the zones 125, 130, 135, 140, 145, or 150. For example, the mobile station 185 crosses a boundary between the zone 140 and 150. Upon entry of the mobile station 185 into the zone 150, the base station 180 sends a notification to register the mobile station 185 within the zone 150 to the mobile switching component 105. The mobile switching component 105 receives the notification to register the mobile station 185 within the zone 150 from the base station 180. The mobile switching component 105 determines entry of the mobile station 185 into the zone 150 upon receipt of the notification to register the mobile station 185 within the zone 150 from the base station 180. The mobile switching component 105 updates the location of the mobile station to indicate that the mobile station 185 is within the zone 150.

The mobile switching component 105 comprises a listing 190 of one or more selected zones and associated common modes of communication. The mobile switching component 105 in one example stores the listing 190 in a system database 191. A selected zone employs a common mode of communication to support wireless service for every mobile station with the selected zone. For example, the mobile switching component 105 identifies the zone 150 as a selected zone. The mobile switching component 105 and the base station 180 employ the common mode of communication, for example, a 1.9 GHz time division multiple access ("TDMA") mode of communication to support the mobile station 185 within the zone 150. Upon receipt of a notification from the base station 180, the mobile switching component 105 compares the zone 150 of the base station 180 to the one or more selected zones of the listing 190 and associated common modes of communication.

Figure 4:
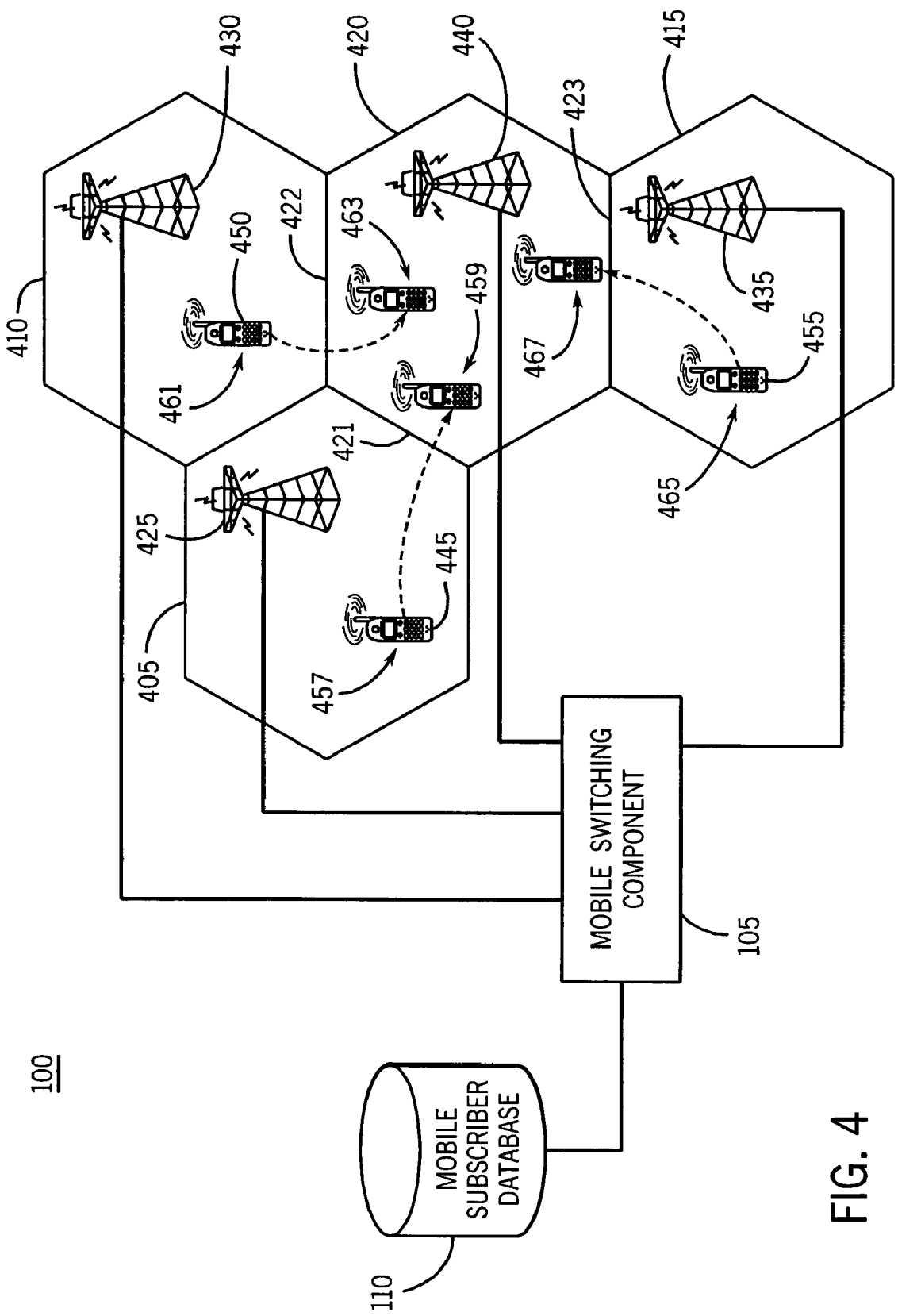
FIG. 4 is another implementation of the apparatus that comprises the mobile switching component, the mobile subscriber database, the network, one or more zones, and one or more mobile stations of the apparatus of FIG. 1.

The mobile switching component 105 in one example receives the listing 190 of the one or more selected zones and associated common modes of communication from a service provider for the network 120. For example, the service provider for the network 120 configures the mobile switching component 105 to employ a common mode of communication (e.g., 1.9 GHz TDMA mode of communication) to support every mobile station within the selected zones, for example, the zone 150 of the listing 190. The mobile switching component 105 is provisioned with one or more zone boundaries, for example, zone boundaries 421, 422, 423 (FIG. 4). Upon receipt of a notification from the base station 180 to register the mobile station 185 within the zone 150, the mobile switching component 105 compares the notification to the zone boundaries to determine entry of the mobile station 185 into a zone. The mobile switching component 105 updates one or more home location register 193 ("HLR") entries and/or one or more visiting location register 194 ("VLR") entries with the zone for the mobile station 185 upon entry of the mobile station 185 within the zone, as will be appreciated by those skilled in the art.

Upon entry of the mobile station 150 into a selected zone, for example, the zone 150, the mobile switching component requests the mobile station 185 to change to a common mode of communication. The mobile switching component 105 sends a request to the base station 180 for the mobile station 185. The base station 180 relays the request to the mobile station 185. In one embodiment, the mobile station 185 re-tunes to the common mode of communication. The mobile switching component 105 supports wireless service for the mobile station 185 through employment of the common mode of communication. In another example, the mobile station 185 fails to change to the common mode of communication. The mobile switching component 105 fails to support wireless service for the mobile station 185 through employment of the common mode of communication where the mobile station 185 fails to change to the common mode of communication.

In one embodiment, the mobile switching component 105 initiates a request to change to a wireless protocol and a radio frequency of the common mode of communication for the zone 150. In another example, the mobile switching component 105 formulates the request based on one or more comparisons between a wireless protocol and a radio frequency of the common mode of communication and a wireless protocol and a radio frequency of a mode of communication of the mobile station 185 outside of the zone 150. For example, the mobile switching component 105 performs a comparison between the wireless protocol employed by a mode of communication for the mobile station 185 outside of the zone 150 to the wireless protocol of the common mode of communication. Where the wireless protocol employed by the common mode of communication differs from the wireless protocol employed by the mode of communication of the mobile station 185 outside the zone 150, the mobile switching component 105 initiates a request to the mobile station 185 to change to the wireless protocol employed by the common mode of communication. Where the radio frequency employed by the common mode of communication differs from the radio frequency employed by the mode of communication of the mobile station 185 outside the zone 150, the mobile switching component 105 initiates a request to the mobile station 185 to change to the radio frequency employed by the common mode of communication.

The mobile switching component 105 performs one or more handoffs, for example, one or more hard handoffs or soft handoffs, for a call established with the mobile station 185 upon entry of the mobile station 185 into a selected zone, for example, the zone 150. The mobile switching component 105 maintains the call with the mobile station 185 through employment of the common mode of communication. The mobile switching component 105 supports every mobile station within the selected zone, for example, the zone 150, that employs the common mode of communication.

An illustrative description of exemplary operation of the apparatus 100 is presented, for explanatory purposes.

Figure 2:
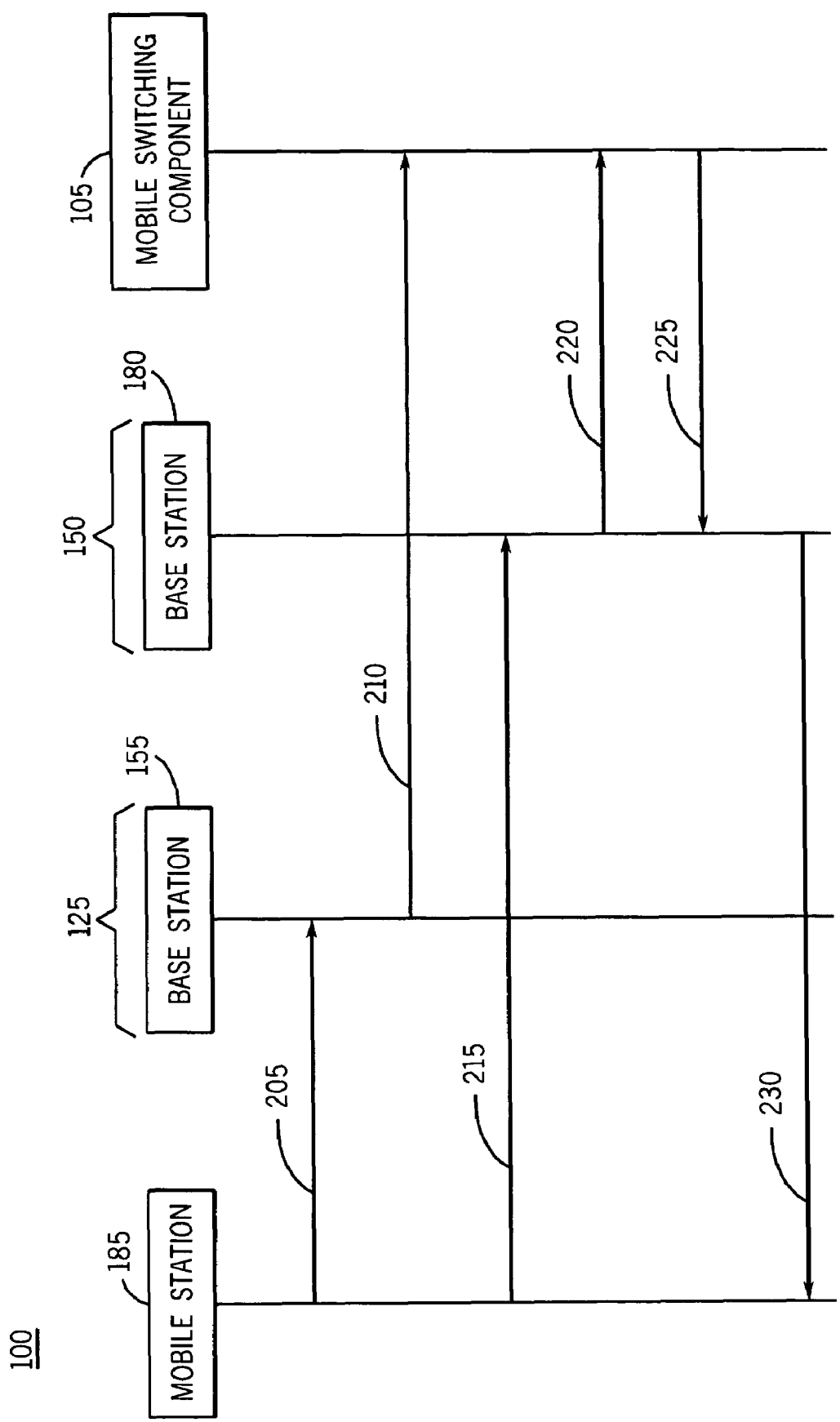
FIG. 2 is an exemplary process flow of determining entry of one or more mobile stations into one or more zones of the network 120 of the apparatus of FIG. 1.

Turning to FIG. 2, the mobile station 185 enters the zone 125. The mobile station 185 employs a mode of communication within the zone 125, for example, a 1.9 GHz TDMA mode of communication. The mobile switching component 105 employs a common mode of communication, for example, an 800 MHz CDMA mode of communication, to support every mobile station within the selected zone, for example, the zone 150. In STEP 205, the mobile station 185 establishes communication with the base station 155. In STEP 210, the base station 155 sends a notification to register the mobile station within the zone 125 to the mobile switching component 105. The mobile switching component 105 compares the zone 125 with the selected zone, the zone 150. The mobile station 185 travels to the zone 150. In STEP 215, the mobile station 185 establishes communication with the base station 180. In STEP 220, the base station 180 sends a notification to register the mobile station within the zone 150 to the mobile switching component 105. The mobile switching component 105 compares the zone 150 with the selected zone, for example, the zone 150. In STEP 225, the mobile switching component 105 determines entry into the selected zone, for example, the zone 150, and initiates a request to the mobile station 185 to change to the 1.9 GHz TDMA mode of communication via the base station 180. In STEP 230, the base station 180 of the zone 150 sends the request to the mobile station 185 to change to the 1.9 GHz TDMA mode of communication.

Figure 3:
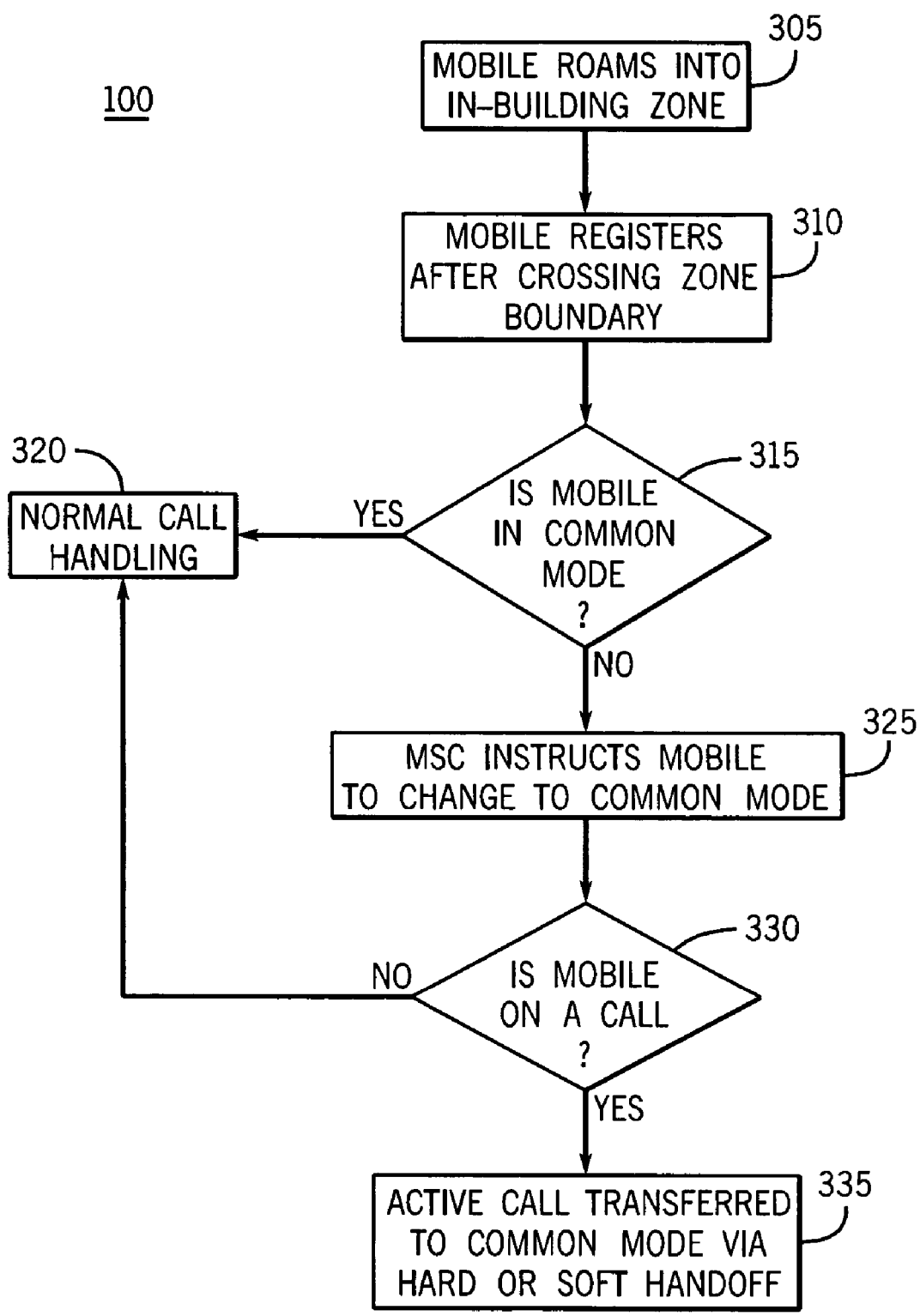
FIG. 3 is an exemplary process flow of requesting the mobile station to change to a common mode of communication of the apparatus of FIG. 2.

Turning to FIGS. 1 and 3, the mobile station 185 enters a selected zone, the zone 150. In STEP 305, the mobile station 185 enters the zone 150. In STEP 310, the mobile station 310 registers in the zone 150. In response to registering in the zone 150, the mobile switching component obtains the mobile subscriber record from the mobile subscriber database 110. In STEP 315, the mobile switching component 105 performs a comparison between the common mode of communication for the zone 150 and a mode of communication of the mobile station 185 from the mobile subscriber record. In STEP 320, the mode of communication of the mobile station 185 is the same as the common mode of communication for the zone 150. The mobile switching component 105 provides normal call handling for the mobile switching component 105 within the zone 150.

In STEP 325, the mode of communication of the mobile station 185 is different from the common mode of communication for the zone 150. The mobile switching component 105 instructs the mobile station 185 to change to the common mode of communication for the zone 150. In STEP 330, the mobile switching component 105 makes a determination if the mobile station 185 is on a call. In STEP 320, the mobile switching component 105 determines that the mobile station 185 is not on a call. The mobile switching component 105 provides normal call handling for the mobile station 185 within the zone 150. In STEP 335, the mobile switching component 105 determines that the mobile station 185 is on a call. The mobile switching component 105 transfers the call from the mode of communication of the mobile station 185 to the common mode of communication for the zone 150.

Figure 5:
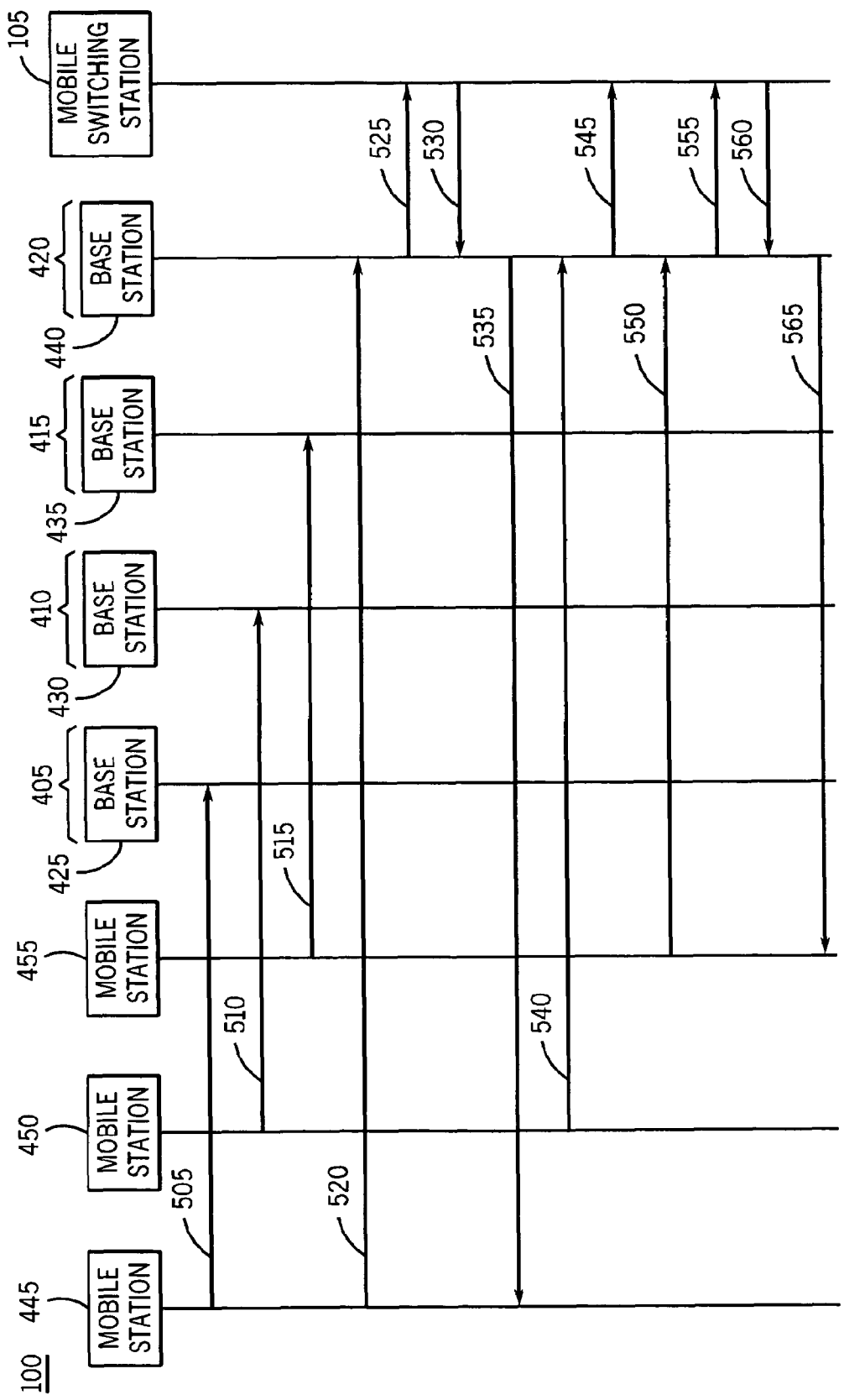
FIG. 5 is an exemplary process flow of requesting the mobile stations to change to a common mode of communication of the apparatus of FIG. 4.

Turning to FIGS. 4-5, the mobile switching component 105 provides wireless service in zones 405, 410, 415, and 420. The zones 405, 410, 415, and 420 comprise base stations 425, 430, 435, and 440, respectively. The mobile switching component 105 and the base stations 425, 430, and 435 employ one or more modes of communication to support wireless service to mobile stations 445, 450, and 455, within the zones 405, 410, and 415, respectively. The mobile station 445 comprises a dual-band phone. The mobile station 445 employs an 800 MHz CDMA mode of communication and an 1900 MHz CDMA mode of communication. The mobile station 450 comprises a dual mode phone. The mobile station 450 employs an advanced mobile phone service ("AMPS") mode of communication and a 1.9 GHz TDMA mode of communication. The mobile station 455 comprises a dual-mode phone. The mobile station 455 employs an analog mode of communication and a digital mode of communication.

The base station 425 supports the mobile station 445 within the zone 405 through employment of the 800 MHz CDMA mode of communication. The base station 430 supports the mobile station 450 within the zone 410 through employment of the 1.9 GHz TDMA mode of communication. The base station 435 supports the mobile station 455 within the zone 435 through employment of the digital mode of communication. The zone 420 comprises a selected zone. The mobile switching component 105 and the base station 440 employ a common mode of communication to provide support for every mobile station within the zone 420. The mobile switching component 105 and the base station 440 employ a 1.9 GHz TDMA mode of communication as the common mode of communication.

The mobile station 445 is located at a location 457 within the zone 405. In STEP 505, the mobile station 445 registers with the base station 425 within the zone 405. The mobile station 450 is located at a location 461 within the zone 410. In STEP 510, the mobile station 450 registers with the base station 430 within the zone 410. The mobile station 455 is located at a location 465 within the zone 415. In STEP 515, the mobile station 455 registers with the base station 435 within the zone 415.

The mobile station 445 travels to a location 459 within the zone 420. The mobile station 445 crosses a zone boundary 421 between the zone 405 and the zone 420. In STEP 520, the mobile station 445 registers with the base station 440 within the zone 420. In STEP 525, the base station 440 sends a notification to register the mobile station 445 within the zone 420 to the mobile switching component 105. In STEP 530, the mobile switching component 105 initiates a request to the mobile station 445 to change to the 1.9 GHz TDMA mode of communication via the base station 440. In STEP 535, the base station 440 receives the request and sends the request to the mobile station 445. In response to the request, the mobile station 445 changes to the 1.9 GHz TDMA mode of communication. The mobile switching component 105 supports wireless service for the mobile station 445 and the base station 440 within the zone 420 through employment of the 1.9 GHz TDMA mode of communication.

The mobile station 450 travels to a location 463 within the zone 420. The mobile station 450 crosses a zone boundary 422 between the zone 410 and the zone 420. In STEP 540, the mobile station 450 registers with the base station 440 within the zone 420. In STEP 545, the base station 440 sends a notification to register the mobile station 450 within the zone 420 to the mobile switching component 105. The mobile switching component 105 determines that the mobile station 450 employs the 1.9 GHz TDMA mode of communication. The mobile switching component 105 supports wireless service for the mobile station 450 and the base station 440 within the zone 420 through employment of the 1.9 GHz TDMA mode of communication.

The mobile station 455 travels to a location 467 within the zone 420. The mobile station 455 crosses a zone boundary 423 between the zone 415 and the zone 420. In STEP 550, the mobile station 455 registers with the base station 440 within the zone 420. In STEP 555, the base station 440 sends a notification to register the mobile station 455 within the zone 420 to the mobile switching component 105. In STEP 560, the mobile switching component 105 initiates a request to the mobile station 455 to change to the 1.9 GHz TDMA mode of communication via the base station 440. In STEP 565, the base station 440 receives the request and sends the request to the mobile station 455. In response to the request, the mobile station 455 fails to changes to the 1.9 GHz TDMA mode of communication. Where the mobile station 455 fails to change to the 1.9 GHz TDMA mode of communication, the mobile station 455 receives degraded wireless service from the mobile switching component 105 and the base station 440 within the zone 420.

Figure 6:
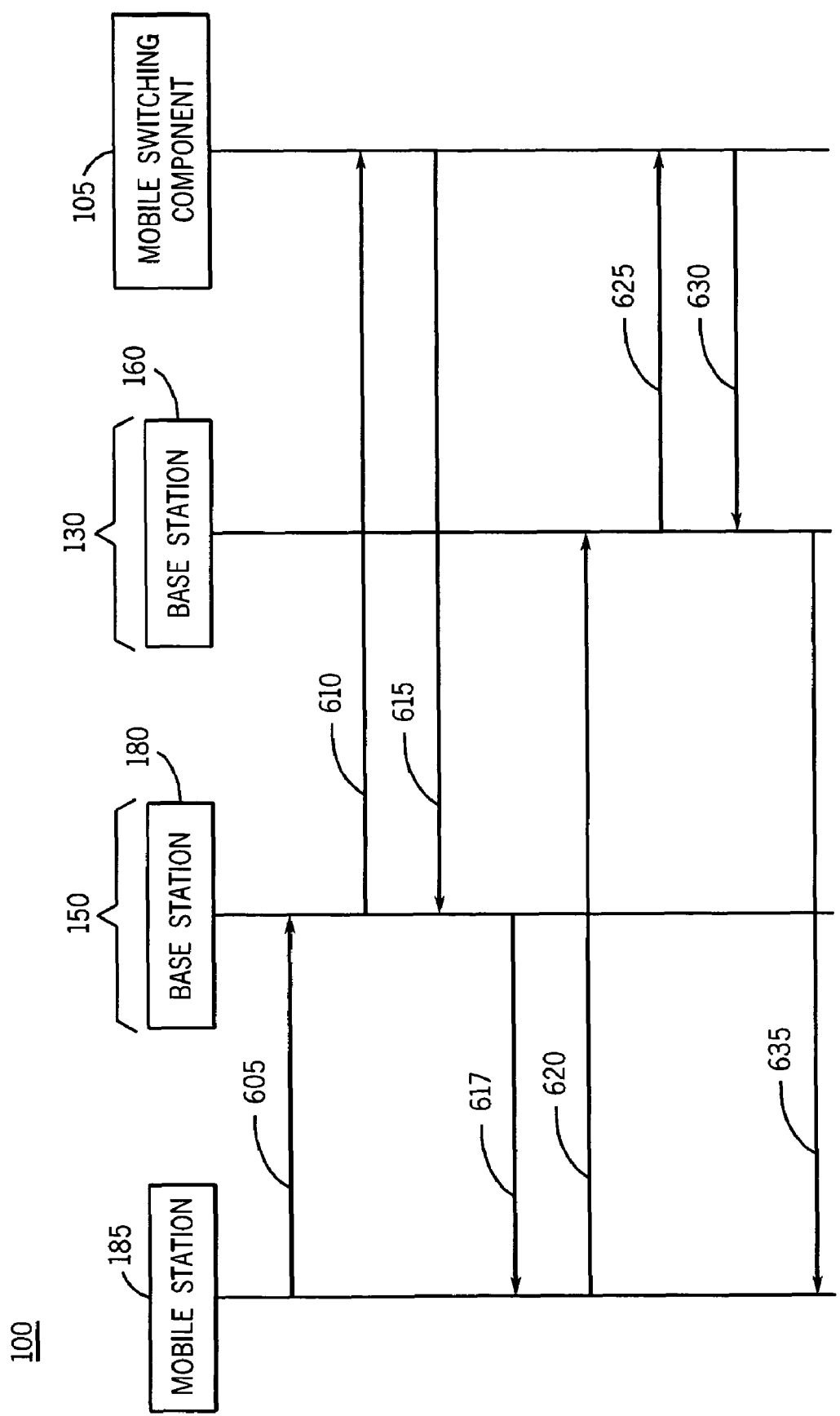
FIG. 6 is an exemplary process flow of requesting the mobile station to change to a default mode of communication of the apparatus of FIG. 2.

Turning to FIGS. 1, 2, and 6, the mobile station 185 travels from a selected zone, for example, the zone 150, to the zone 130. The mobile station 185 employs a default mode of communication, for example, a 800 MHz CDMA mode of communication. The mobile switching component 105 employs a common mode of communication, for example, a 1.9 GHz TDMA mode of communication, within the zone 150. The mobile station 185 travels to the zone 150. In STEP 605, the mobile station 185 establishes communication with the base station 180. In STEP 610, the base station 180 sends a notification to register the mobile station 185 within the zone 150 to the mobile switching component 105. The mobile switching component 105 compares the zone 150 with the selected zone, for example, the zone 150. In STEP 615, the mobile switching component 105 determines entry into the selected zone and initiates a request to the base station 180 to request the mobile station 185 to change to the 1.9 GHz TDMA mode of communication. In STEP 617, the base station 180 receives the request from the mobile switching component 105 and sends the request to the mobile station 185 to change to the 1.9 GHz TDMA mode of communication.

The mobile station 185 travels to the zone 130. In STEP 620, the mobile station 185 establishes communication with the base station 160. In STEP 625, the base station 160 sends a notification to register the mobile station 185 within the zone 130 to the mobile switching component 105. The mobile switching component 105 compares the zone 130 with the selected zone, for example, the zone 150. In STEP 630, the mobile switching component 105 determines exit from the selected zone and initiates a request to the base station 160 to request the mobile station 185 to change to the default mode of communication for the mobile station. In STEP 635, the base station 160 receives the request from the mobile switching component 105 and send the request to the mobile station 185. The mobile station 185 changes to the 800 MHz CDMA mode of communication for the mobile station 185.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/ or assembly language for performing one or more portions of one or more embodiments of the invention. Examples of a computer-readable signal-bearing medium for the apparatus 100 comprise the recordable data storage medium 101 of the mobile switching component 185. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a mobile switching component that identifies a mode of communication of a mobile station upon entry of the mobile station into a zone, wherein the mode of communication comprises a wireless protocol and a radio frequency, wherein the mobile switching component performs a comparison of the mode of communication of the mobile station and a common mode of communication of the zone, wherein the common mode of communication comprises a wireless protocol and a radio frequency, wherein every mobile station supported by the mobile switching component in the zone employs the common mode of communication;
wherein the mobile switching component initiates a request to the mobile station to change to the wireless protocol and the radio frequency of the common mode of communication based on the comparison.

2. The apparatus of claim 1, wherein the every mobile station comprises a first mobile station and a second mobile station;
wherein the mobile switching component requests the first mobile station to change to the common mode of communication upon entry of the first mobile station into the zone;

wherein the mobile switching component requests the second mobile station to change to the common mode of communication upon entry of the second mobile station into the zone;

wherein the mobile switching component supports wireless service for the first mobile station and the second mobile station within the zone through employment of the common mode of communication.

3. The apparatus of claim 1, wherein the mobile station employs a first mode of communication outside of the zone,
wherein the mobile switching component sends the request to the mobile station to request the mobile station to change to the wireless protocol and the radio frequency of the common mode of communication;

wherein in response to the request, the mobile station changes from the first mode of communication to the common mode of communication.

4. The apparatus of claim 2, wherein the mobile switching component requests the first mobile station to change to the wireless protocol and the radio frequency of the common mode of communication;

wherein the mobile switching component requests the second mobile station to change to the wireless protocol and the radio frequency of the common mode of communications.

5. The apparatus of claim 1, wherein the mobile switching component sends the request to the mobile station to request the mobile station to change to the common mode of communication upon entry of the mobile station into the zone;

wherein the mobile switching component provides wireless service to the mobile station through employment of the common mode of communication within the zone if the mobile station changes to the wireless protocol and radio frequency of the common mode of communication;

wherein the mobile switching component withholds the wireless service to the mobile station within the zone if the mobile station fail to change to the wireless protocol and radio frequency of the common mode of communication.

6. The apparatus of claim 1, wherein one or more zones comprise the zone, wherein the mobile switching component determines entry of the mobile station into the zone.

7. The apparatus of claim 6, wherein the one or more zones comprise one or more areas associated with one or more base stations, wherein the mobile switching component receives a notification from a base station of the one or more base stations upon entry of the mobile station into an area associated with the base station;

wherein the mobile switching component employs the notification from the base station to identify the area as the zone.

8. The apparatus of claim 7, wherein in response to the notification, the mobile switching component registers the mobile station in the zone.

9. The apparatus of claim 7, wherein the mobile switching component cooperates with the base station to provide wireless service to the mobile station within the zone through employment of the common mode of communication.

10. The apparatus of claim 1, wherein the zone comprises a first zone, wherein one or more zones comprise the first zone and a second zone, wherein the common mode of communication comprises a first mode of communication, wherein the mobile station employs a second mode of communication within the second zone;

wherein the mobile station employs the second mode of communication in the second zone to establish a call with a telephony device, wherein the mobile station travels from the second zone to the first zone;

wherein the mobile switching component determines entry of the mobile station into the first zone;

wherein the mobile switching component requests the mobile station to change from the second mode of communication to the first mode of communication;

wherein the mobile switching component transfers the call from the second mode of communication to the first mode of communication;

wherein the mobile switching component maintains the call between the mobile station within the first zone and the telephony device through employment of the first mode of communication.

11. The apparatus of claim 1, wherein the zone comprises a first zone of one or more zones, wherein the first zone comprises a building, wherein a second zone of the one or more zones comprises outside of the building;

wherein the mobile switching component employs a first mode of communication to provide wireless service to the mobile station outside of the building;

wherein the mobile switching component determines entry of the mobile station into the building from outside of the building;

wherein the mobile switching component requests the mobile station to change to the common mode of communication;

wherein the mobile switching component employs the common mode of communication to provide the wireless service to the mobile station in the building;

wherein the mobile switching component determines entry of the mobile station outside of the building from the building;

wherein the mobile switching component requests the mobile station to change to the first mode of communication;

wherein the mobile switching component employs the first mode of communication to provide the wireless service to the mobile station outside of the building.

12. The apparatus of claim 1, wherein the wireless protocol comprises one of Code Division Multiple Access ("CDMA"), Time Division Multiple Access ("TDMA"), Global System for Mobile Communications ("GSM"), analog, or Universal Mobile Telecommunications System ("UMTS");

wherein the radio frequency comprises one of 850 MHz, 1.8 GHz, 1.9 GHZ, and 2 GHz.

13. A method, comprising the steps of:

determining an entry of a mobile station into a zone;

identifying a mode of communication of the mobile station wherein the mode of communication of the mobile station comprises a wireless protocol and a radio frequency;

performing a comparison of the mode of communication of the mobile station and a common mode of communication of the zone wherein the common mode of communication comprises a wireless protocol and a radio frequency;

initiating a request to the mobile station to change to the wireless protocol and the radio frequency of the common mode of communication from the mode of communication of the mobile station based on the comparsion, and supporting wireless service for every mobile station in the zone that employs the common mode of communication.

14. The method of claim 13, wherein the step of determining the entry of the mobile station into the zone comprises the steps of:
   receiving a request to register the mobile station within the zone; and
   determining the entry of the mobile station into the zone in response to the request.

15. The method of claim 13, wherein the step of identifying the mode of communication of the mobile station comprises the steps of:
   obtaining a mobile subscriber record for the mobile station, wherein the mobile subscriber record comprises the mode of communication of the mobile station.

16. The method of claim 13, wherein the wireless protocol comprises a first wireless protocol and the radio frequency comprises a first radio frequency, wherein the mode of communication of the mobile station comprises a second wireless protocol and a second radio frequency, wherein the step of performing the comparison of the mode of communication of the mobile station and the common mode of communication comprises the steps of:
   performing a first comparison between the first wireless protocol and the second wireless protocol;
   performing a second comparison between the first radio frequency and the second radio frequency; and
   formulating the request to the mobile station to change to the common mode of communication based on the first comparison and the second comparison.

17. The method of claim 13, wherein one or more zones comprise the zone, wherein the mobile station is located within a second zone of the one or more zones, wherein the mobile station employs one or more modes of communication, wherein the one or more modes of communication comprise the common mode of communication and a default mode of communication, the method further comprising the steps of:
   employing the default mode of communication to establish a call between the mobile station located within the second zone and a telephony device;
   transferring the call with the mobile station from the default mode of communication to the common mode of communication; and
   employing the common mode of communication to maintain the call between the mobile station and the telephony device.

18. The method of claim 17, wherein the step of transferring the call with the mobile station to the common mode of communication comprises the step of:
   performing a hard handoff of the call to the common mode of communication.

19. The method of claim 17, wherein the step of transferring the call with the mobile station to the common mode of communication comprises the step of:
   performing a soft handoff of the call to the common mode of communication.

20. The method of claim 13, wherein the mobile station supports one or more modes of communication, wherein the one or more modes of communication comprise the common mode of communication and a default mode of communication, wherein the request comprises a first request, the method further comprising the steps of:
   determining an exit of the mobile station from the zone; and
   initiating a second request to the mobile station to change from the common mode of communication to the default mode of communication.

* * * * *